(12) United States Patent
Dixon

(10) Patent No.: US 12,175,480 B1
(45) Date of Patent: Dec. 24, 2024

(54) FRAUDULENT CLAIMS DETECTION SYSTEM

(71) Applicant: United Services Automobile Association (USAA), San Antonio, TX (US)

(72) Inventor: David Patrick Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/317,305

(22) Filed: May 15, 2023

Related U.S. Application Data

(63) Continuation of application No. 16/886,424, filed on May 28, 2020, now Pat. No. 11,741,478.

(51) Int. Cl.
| | |
|---|---|
| *G06Q 40/08* | (2012.01) |
| *G06Q 10/0635* | (2023.01) |
| *G06Q 10/10* | (2023.01) |
| *G06Q 30/016* | (2023.01) |
| *G06Q 30/018* | (2023.01) |
| *G10L 15/183* | (2013.01) |
| *H04W 4/029* | (2018.01) |

(52) U.S. Cl.
CPC ..... *G06Q 30/0185* (2013.01); *G06Q 10/0635* (2013.01); *G06Q 10/10* (2013.01); *G06Q 30/016* (2013.01); *G06Q 40/08* (2013.01); *G10L 15/183* (2013.01); *H04W 4/029* (2018.02)

(58) Field of Classification Search
CPC .......... G06Q 30/0185; G06Q 10/0635; G06Q 10/10; G06Q 40/08
See application file for complete search history.

(56) References Cited

U.S. PATENT DOCUMENTS

| | | | |
|---|---|---|---|
| 2008/0195387 A1 | 8/2008 | Zigel et al. | |
| 2018/0351980 A1* | 12/2018 | Galula | ............... H04L 63/1416 |
| 2019/0130490 A1* | 5/2019 | Durkee | .................. G06Q 40/08 |

FOREIGN PATENT DOCUMENTS

| | | | | |
|---|---|---|---|---|
| AU | 2018321384 A1 * | 3/2020 | ............. | G06Q 40/10 |

OTHER PUBLICATIONS

Credit Card Fraud Detection via Kernel-Based Supervised Hashing Zhenchuan Li; Guanjun Liu; Shuo Wang; Shiyang Xuan; Changjun Jiang (Year: 2018).*

Corcoran, Medb. Big Data, Big Opportunities. Accountancy Ireland 47.4: 20-21, Institute of Chartered Accountants in Ireland, Aug. 2015, 6 pages.

(Continued)

*Primary Examiner* — William E Rankins
(74) *Attorney, Agent, or Firm* — Perkins Coie LLP

(57) ABSTRACT

Technology for determining an insurance fraud risk associated with a user comprises receiving, at an enterprise, a call or a chat from a user device associated with the user. Data associated with the call or the chat is analyzed to determine if at least one factor indicating fraud is present. A weighted level of possible fraud associated with the at least one factor is determined. The weighted level of possible fraud is compared to at least one weight threshold. The user is identified as an increased fraud risk based on the weighted level of possible fraud meeting or exceeding the at least one weight threshold.

20 Claims, 5 Drawing Sheets

(56) References Cited

OTHER PUBLICATIONS

Abraham, Thomas. Insurers: The First and Next Alternative Data Innovators? Carrier Management Wells Media Group, Inc., Nov. 27, 2018, 4 pages.

Adomako, Godfred, F. Strategies in Mitigating Medicare/Medicaid Fraud Risk. ProQuest Dissertations and Theses, ProQuest Dissertations Publishing, May 2017, 98 pages.

* cited by examiner

FRAUDULENT CLAIMS DETECTION SYSTEM

CROSS-REFERENCE TO RELATED APPLICATION

This application is a continuation of U.S. patent application Ser. No. 16/886,424, filed on May 28, 2020, entitled "FRAUDULENT CLAIMS DETECTION SYSTEM," which is hereby incorporated by reference in its entirety for all purposes.

TECHNICAL FIELD

This disclosure is directed generally to systems, methods, and apparatus for detecting fraudulent insurance claims.

BACKGROUND

Insurance fraud is expensive for the insurance company and is often difficult to detect. People may voluntarily or involuntarily underinsure their property. Some people may attempt to get coverage after an incident occurs and then file a claim. Others may seek out ways to file a claim for a cash settlement while not actually sustaining a loss. Accordingly, it is desirable to improve the ability to detect fraudulent claims.

Figure 1:
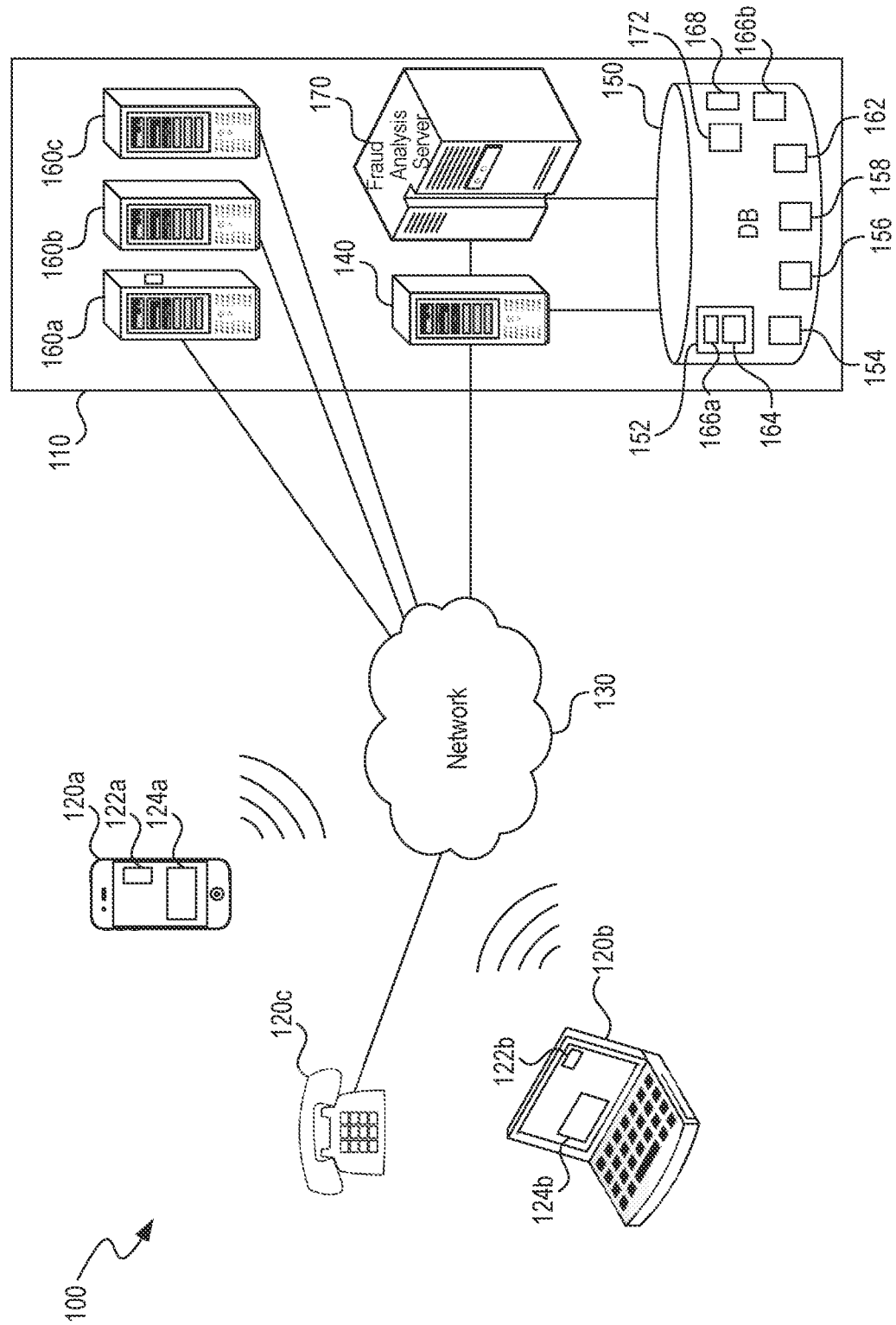
FIG. 1 shows an example of a call system that can automatically detect potential fraud and fraudulent claims in accordance with embodiments of the present technology.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims

DETAILED DESCRIPTION

A company that sells insurance receives many calls and inquiries each year. The insurance company may use a call center system that can accept and facilitate a voice call and/or electronic chat with a user. In some cases, a user may ask questions to determine what insurance coverage they currently have and/or determine what coverage they are eligible for through a new policy. Insurance fraud is expensive and is currently difficult to identify. Insurance fraud may be attempted by new applicants or by users who already have a policy. Therefore, it is advantageous to have a system that can automatically identify possible fraud to avoid making unnecessary and unwarranted payments.

To overcome at least some of the issues described above, this patent document describes systems, apparatus, and methods for automatically determining that some inquires and/or filed claims may be fraudulent. Questions and inquiries from a user can be analyzed by fraud analysis algorithms to identify a probability that a request may be fraudulent. The system can store analysis of the interactions and weighted scores that indicate the probability of fraud, and the information can be retrieved and matched to a subsequently filed insurance claim. Voice calls and chats can be stored and later matched with a filed insurance claim. The system can suggest questions for a customer service representative to ask during a call/chat with a user that can help identify fraud. After a claim is filed, the system can apply previously stored data and fraud analysis algorithms to determine a probability or likelihood that the claim is fraudulent and suggest a lower payout if the fraud is hard to prove. The example headings for the various sections below are used to facilitate the understanding of the disclosed subject matter and do not limit the scope of the claimed subject matter in any way. Accordingly, one or more features of one section can be combined with one or more features of another section.

I. Automatically Detect Potential Fraud Before Claim is Filed

FIG. 1 shows an example of a call system 100 that can automatically detect potential fraud and fraudulent claims in accordance with embodiments of the present technology. The call system 100 can be associated with an enterprise 110, such as an insurance company. The enterprise 110 can include a call center server 140. One or more agencies 160 (identified individually as 160a, 160b and 160c) and/or agents that are located remote from the call center server 140 can be affiliated with the enterprise 110, employed by the enterprise 110, and/or sell products associated with the enterprise 110. Unless indicated otherwise, the agencies 160 are referred to collectively as part of the enterprise 110 and the call center server 140.

A user can call the enterprise 110 with a device associated with a user ("user device") 120 (identified individually as 120a, 120b and 120c) and speak with an agent or a customer service representative (CSR). As used herein, a person calling into the call center system is generally referred to as a "user". The user device can be a mobile device, mobile phone, telephone, tablet computer, mobile media device mobile gaming device, vehicle-based computer, dedicated terminal, public terminal, desktop, laptop computer, kiosk, smartwatch or other wearable, etc. The call from the user device 120 can be sent to or managed by the call center server 140, which can include one or more servers. For example, a call initiated by the user device 120 may be transmitted to either an agency 160 or the call center server 140 via a communication network 130. The communication network 130 may include the Internet, a cellular network, a public switched telephone network (PSTN), a voice over Internet Protocol (VOIP) network, cable, satellite, or any combination thereof. The network 130 can be any combination of local area and/or wide area networks, using wired and/or wireless communication systems.

The user devices 120 that are not a landline may include an application 122 (identified individually as 122*a* and 122*b*) loaded thereon that is associated with the enterprise 110. In some embodiments, the application 122 can be stored remotely on a server (in the "cloud"). The application 122 can launch a chat window 124 (identified individually as 124*a* and 124*b*) via which the user can correspond with the enterprise 110. As included herein, the term "chat" refers to electronic exchanges over the application 122 and/or other website associated with the enterprise 110.

The call center server 140 can include or can be connected to a database 150 that can store user profiles 152. The user profiles 152 can store information associated with one or more insurance policies held by the user, if any, as well as any potential fraud record 164 and weighted scores 166 that may indicate a potential for a current or future claim to be fraudulent.

The database 150 can also include various information that may or may not be associated with a user profile 152, and that may be useful in detecting fraud. One or more identifiers (e.g., a phone number, a geolocator, an Internet Protocol (IP) address, a name, an email address, etc.) may be associated with a user profile 152 or with any of the stored data, such as chat sessions 154, voice recordings 156, unmatched potential fraud records 162, and claims 168. Fraud scenarios 158 and one or more weight threshold 172 can also be stored and are discussed further below.

The enterprise 110 can include a fraud analysis server 170 that can provide analysis real-time as a CSR is talking/chatting with a user. The fraud analysis server 170 can analyze saved voice recordings 156 and/or chat sessions 154 for tone, content, and/or context. The fraud analysis server 170 can identify key words, clusters of words and/or phrases that may indicate fraud, such as "hypothetical" and/or "cash". Many more words/phrases may be identified as associated with potential fraud. The fraud analysis server 170 can contact other information sources over the network 130, such weather data, crime reports and/or statistics.

This patent document describes various operations performed by the call center server 140 and fraud analysis server 170. In some embodiments, a single server can perform the operations described for the servers 140 and 170. In some other embodiments, multiple servers can perform the operations described for the servers 140 and 170.

When a user calls the enterprise 110 to speak to a CSR, the call center server 140 can gather information to identify the user. Examples of an identifier can include a member number, login information, and/or personal information (e.g., social security number, phone number, etc.). The user may indicate a topic of conversation (e.g., reason for the call) via the user device 120. The user can provide the topic to an Interactive Voice Response (IVR) system within the call center server 140 in some implementations. In an example case, a topic may include insurance coverage for a theft or damage to property.

The user can also use the application 122 on the user device 120 to contact the enterprise 110. For example, the application 122 can open the chat window 124. In some embodiments, the call center server 140 can send a link to the user device 120 via text and/or email that will allow the chat window 124 to open, or the link can launch a browser window. The application 122 and the chat window 124 can allow the user to communicate electronically with the enterprise 110 as discussed further below. The chat window 124 can be any type of electronic window displayed on the screen of the user device 120, and can accept input via any allowable input of the user device 120 (e.g., keyboard, mouse, microphone, gesture, and/or touchscreen).

Figure 3:
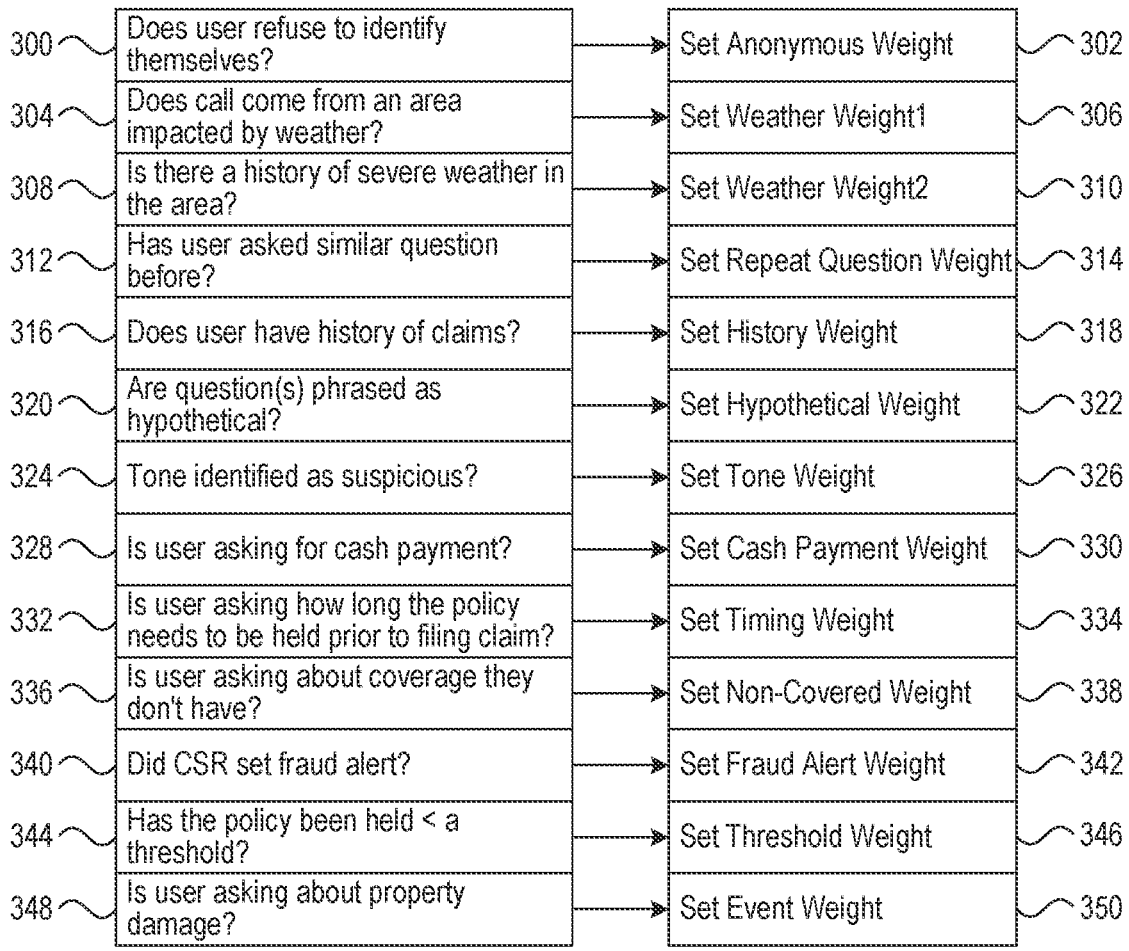
FIG. 3 shows an example table of factors that can be considered when identifying a potential fraud event and determining associated weights in accordance with an embodiment of the present technology.

The fraud analysis server 170 can record and analyze the user's call/chat in real-time or analyze after the call/chat has ended to provide one or more weighted scores 166 that can indicate a potential for fraud (as further described in FIG. 3). In some embodiments, the fraud analysis server 170 can be operated or managed by a third-party vendor. The weighted scores 166 can be determined using various algorithms and factors. The weighted scores 166 and any other data associated with potential fraud can be stored in the user profile 152 or other file and linked to the particular user profile 152, chat session 154 and/or voice recording 156.

The fraud analysis server 170 can also interact with a CSR while they are on a call with a user. The fraud analysis server 170 can display or otherwise present questions for the CSR to ask the user based on factors analyzed in the call/chat, or in response to a potential fraud alert generated by the CSR. In some cases, the fraud analysis server 170 can compare key words and scenarios with known or common fraud scenarios 158. In some embodiments, the fraud analysis server 170 can communicate with the IVR and/or a chatbot to present questions to the user.

A technical advantage or benefit of presenting questions and determining the weighted score that can be used to identify fraudulent claims is that a potential fraud can be identified prior to a claim being filed. Accordingly, data that can potentially identify a fraudulent claim can be stored automatically.

An additional technical advantage is that data from a phone call and/or chat can be automatically analyzed for content and/or context, so the most current fraud detection models, weather data, etc., can be applied automatically and intelligently (e.g., using machine learning). This reduces inaccuracies caused by CSRs and minimizes potential complications due to language and/or culture differences. A further technical improvement is that additional input from a CSR is not required, and thus the enterprise 110 is not solely relying on the CSR to identify a suspicious call/chat.

Figure 2:
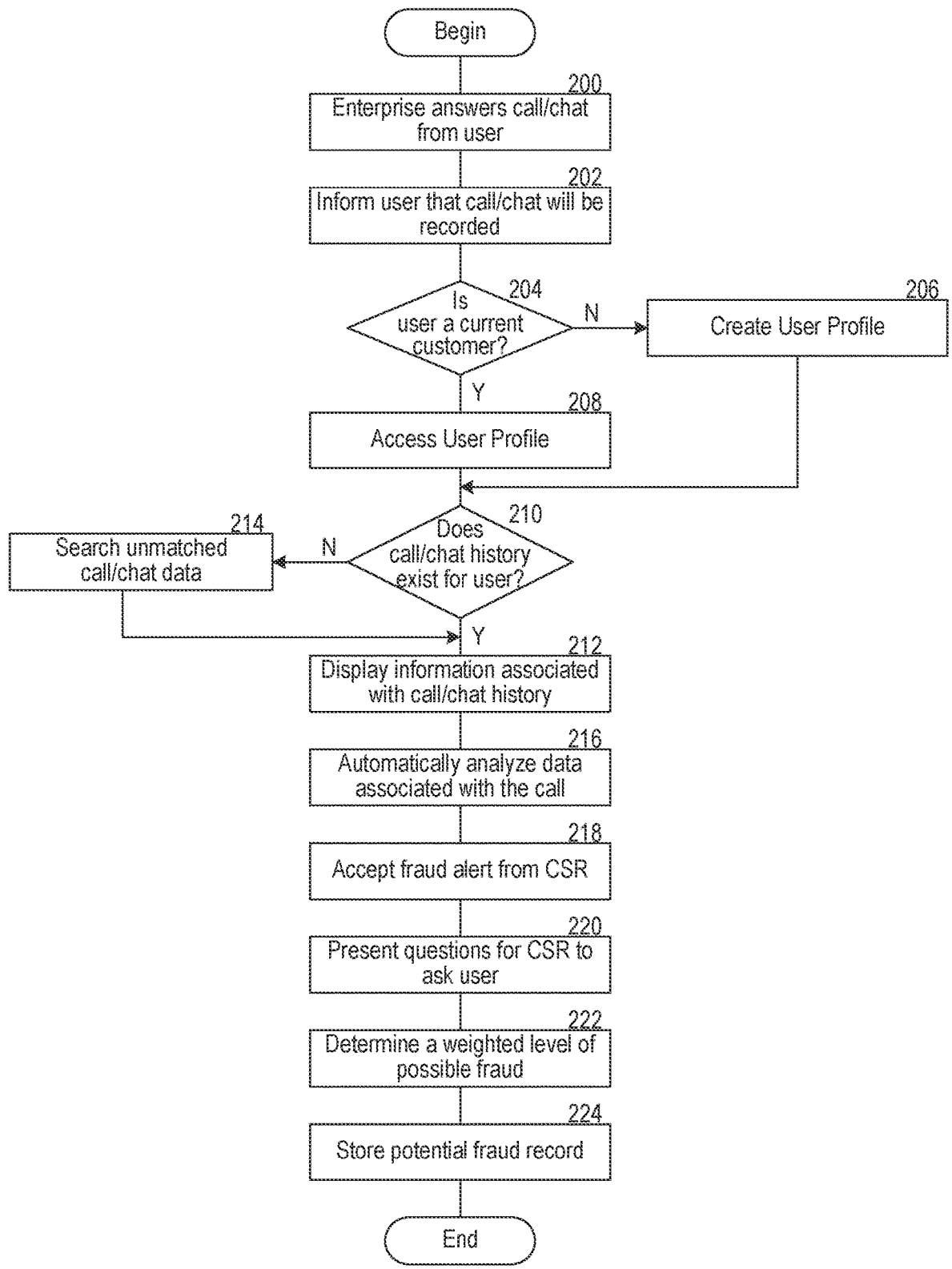
FIG. 2 shows an example process of receiving a call/chat from a user and analyzing the call/chat with the fraud analysis server to determine whether potential fraud may occur in accordance with an embodiment of the present technology

FIG. 2 shows an example process of receiving a call and/or chat from a user and analyzing the call/chat with the fraud analysis server 170 to determine if potential fraud may occur in accordance with an embodiment of the present technology. FIG. 2 describes a technical solution to identifying and saving a record of potential fraud that can be used to prevent or minimize a future fraudulent insurance payment. At operation 200 the enterprise 110 receives and answers a call from a user. The user may be a current customer, such as a user who has an insurance policy with the enterprise 110. In other embodiments, the user may not be a current customer or may want to remain anonymous or hide their identify from the enterprise 110. In some cases, the user can call the agency 160. The agency 160 can electronically alert or otherwise connect to the call center server 140 over the network 130 so that the fraud analysis server 170 can analyze the call. In still other embodiments, the user can contact the enterprise 110 using the application 122, such as through the chat window 124.

At operation 202 the CSR, IVR system, or other service of the enterprise 110 can inform the user that the call/chat will be recorded.

At operation 204 the enterprise 110 can attempt to determine if the user is a current customer. The IVR system may collect data to identify the user, such as a phone number, IP address, physical address, client code, policy number, etc., or the CSR may ask questions to determine and/or verify the identity of the user.

If the user is not a current customer, at operation 206 the call center server 140 can create a user profile 152 that is stored in the database 150. If the user does not want to identify themselves, the call center server 140 can create the user profile 152 with whatever data is available, such as a phone number and/or any data entered by the CSR during the call/chat. In some cases, the call center server 140 can create a user profile 152 with minimum data, such as a phone number so that the data can be tracked and matched to a claim at a later time.

If the user is a current customer, at operation 208 the call center server 140 can access the user profile 152 stored in the database 150. In some embodiments, the call center server 140 can display one or more potential fraud alerts if any were previously associated with the user profile 152.

In some embodiments, at operation 210 the call center server 140 can determine if there is a call history or chat history associated with the user profile 152. The call/chat history may indicate that the user has made more than one inquiry. The fraud analysis server 170 can analyze the call/chat history for content/context, or the analysis may have already been accomplished. At operation 212 the fraud analysis server 170 can display information associated with the call/chat history to the CSR during the call.

If at operation 210 no call/chat history is associated with the user profile 152, at operation 214 the call center server 140 can search unmatched logs of chat sessions 154 and voice recordings 156 to see if a match can be made. For example, the fraud analysis server 170 may use voice analysis or a comparison of telephone or IP numbers to try to match previously stored data with a user profile 152. Depending upon the confidence level associated with the match (e.g., if the confidence level is above a predefined threshold), the CSR may be provided data on a display that indicates previous chat sessions 154 and/or voice recordings 156 exist.

At operation 216 the fraud analysis server 170 can automatically analyze data associated with the call/chat for trigger words, clusters of words, tone, content and/or context. For example, the user may be calling to verify coverage and say the word "hypothetical" or "hypothetically". The fraud analysis server 170 can identify that there is a potential that the event has already happened, and the user is trying to determine if they have appropriate coverage and/or how much coverage. In another example, the user may ask how long a policy needs to be in force before a claim can be filed or indicate that they don't know an exact date of when damage or a loss occurred. In another embodiment, the user may ask if a receipt proving a purchase is required to make a claim.

In some embodiments the fraud analysis server 170 can access other services and/or databases over the network 130. For example, the fraud analysis server 170 can review past, current and projected weather data for an area or region. Past weather data may include specific geographic identification that can be compared to a user's address, for example, to attempt to determine if a particular storm would have impacted a specific address. In some embodiments, satellite imagery may be used. The fraud analysis server 170 can also compare the potential claim to other claims that have been filed by other users in the same area. For example, if an area is prone to hail storms or has experienced one or more tornadoes, other clients may have filed claims and the property locations can be compared. A local police department, or jurisdiction in which a user lives or reported traveling to, can be accessed for crime reports if the question is about, for example, damage to or theft of a car.

In some embodiments, at operation 218 the fraud analysis server 170 can accept a fraud alert from the CSR. If a fraud alert is received or potential fraud is detected by the fraud analysis server 170, at operation 220 the fraud analysis server 170 can present pre-formulated questions to the CSR, such as on a display, for the CSR to ask the user. The pre-formulated questions can be designed to detect fraud. Example questions can be based on automatically detected content of the call/chat and/or selected by the CSR. For example, the CSR can ask "Do you currently have the item? (e.g., vehicle, couch, television, etc.)" or "Has the item been stolen?" In other embodiments, the detection of potential fraud or the initiation of an alert may initiate the transfer of the call to a fraud specialist and/or a specific fraud server. If the call/chat is with the agency 160, the CSR of the agency 160 can access potential questions stored on the fraud analysis server 170 and/or receive the pre-formulated questions from the fraud analysis server 170.

At operation 222 the fraud analysis server 170 can determine a weighted level of possible fraud. More than one factor may be considered to determine a weighted score and the weighted level of possible fraud, as discussed further in FIG. 3.

At operation 224 the fraud analysis server 170 can store a potential fraud record 164 in the database 150. If the user is known, the potential fraud record 164 can be stored in the user profile 152. The potential fraud record 164 may be retained for a predetermined length of time, such as three months, six months, or twelve months, or may be retained indefinitely. In some embodiments, the length of time the potential fraud record 164 is retained may be based on the subject of the call, the number of times a potential fraud record 164 has been recorded for the user profile 152, and/or if a user has been suspected of filing a fraudulent claim in the past (e.g. a fraud flag or other indication may be set in the user profile 152). Claims that the user files in the future can be compared to any potential fraud records 164 stored in their user profile 152. If the user has not been identified, the record can be stored in a file of unmatched potential fraud records 162 with, or linked to, any other available data that was determined, such as an IP address and/or phone number. In other embodiments, future insurance claims can be compared to unmatched potential fraud records 162 to try to determine whether the user inquired about coverage for the event prior to obtaining the policy.

Although the method of FIG. 2 primarily discusses the analysis of data in real-time or near real-time, the fraud analysis server 170 can analyze recorded conversations between users and CSRs as well as chat logs and/or email and/or other user requests. The fraud analysis server 170 can create the potential fraud record 164 and the unmatched potential fraud records 162 and store them in the database 150 for future review as needed and to use as training models for machine learning.

II. Consider Factors and Determine Associated Weights for Identifying Fraud

FIG. 3 shows an example table of factors that can be considered when identifying a potential fraud event and determining associated weighted scores in accordance with an embodiment of the present technology. The factors can be identified by the fraud analysis server 170 using voice and/or text analysis. In some embodiments, if the user profile 152 indicates appropriate insurance coverage for the type of event the user is asking about, the fraud analysis server 170 may set the weighted scores 166 to zero.

If the user profile 152 is identified for the call/chat, the fraud analysis server 170 can save non-zero weights as weighted scores 166a in and/or associated with the user profile 152. If a user profile 152 has not been identified, the fraud analysis server 170 can save non-zero weights in the database 150 as weighted scores 166b and link or otherwise identify them as associated with a particular chat session 154 and/or voice recording 156.

At operation 300 the fraud analysis server 170 can detect that the user refuses to identify themselves and at operation 302 can set a non-zero or positive Anonymous Weight. Although there may be legitimate reasons for a user to wish to remain anonymous, such as to avoid future solicitations from a business, it is possible that the user does not want the enterprise 110 to make a record of their inquiry. In some embodiments, if the user's call in this scenario can be matched with the user profile 152, such as through a phone number, the Anonymous Weight may be set higher than if the user cannot be matched.

At operation 304 the fraud analysis server 170 can detect if the call/chat originates from a weather impacted area. The fraud analysis server 170 may use the address stored in the user profile 152 or geolocation data associated with the call to access current and/or forecasted weather data over the network 130. In some embodiments the address of concern may be different, such as a location of a residence or second property remote from where the user is calling from. If weather is related to storms, for example, the call/chat may indicate that the user is concerned about damage or has already sustained damage and is attempting to determine how best to open a policy and file a claim. If weather in the appropriate area is determined to be occurring, at operation 306 the fraud analysis server 170 can set a positive or non-zero Weather Weight1. In some cases, if the user currently has coverage for storms similar to what they are inquiring about, the fraud analysis server 170 can set the Weather Weight1 to zero.

At operation 308 the fraud analysis server 170 can use the address stored in the user profile 152 or geolocation data associated with the call/chat to access historical weather data over the network 130, which can be at a different location as discussed above. If the fraud analysis server 170 determines that severe weather has occurred within a predetermined amount of time before the call, at operation 310 the fraud analysis server 170 can set a positive or non-zero Weather Weight2.

If the user profile 152 has been identified, at operation 312 the fraud analysis server 170 can determine if the user has previously called the enterprise 110 with a similar question. In some cases, a repeat question may indicate that the user has attempted the same fraud before and/or has made a similar claim that resulted in a payment. This data may be captured in the user profile 152 as a previous potential fraud record 164 or within a history of call/chat logs. If the fraud analysis server 170 determines that a similar question or request has been made, at operation 314 the fraud analysis server 170 can set a positive or non-zero Repeat Question Weight.

At operation 316 the fraud analysis server 170 can determine from the user profile 152 if the user has a history of filing claims. If the user has a history of filing claims, such as within a predetermined time period of six months, twelve months and/or indefinitely, at operation 318 the fraud analysis server 170 can set a positive or non-zero History Weight. In some cases, the fraud analysis server 170 may set a higher positive History Weight if the user has filed a claim for a similar circumstance in the past.

At operation 320, the fraud analysis server 170 can analyze the word choice in the call/chat to determine if the request is phrased as "hypothetical". Additional word triggers may be "what if", "just wondering", "just inquiring", "hypothetically". "hypothetical situation", etc. As discussed above, single words or phrases may be identified. At operation 322, the fraud analysis server 170 can set a positive or non-zero Hypothetical Weight if it detects that the request is posed as hypothetical.

At operation 324, the fraud analysis server 170 can analyze the tone and/or word choice of the call/chat to determine if the context/content can be identified as suspicious. In some cases, the tone may be overly friendly while in other cases the tone may be angry. For voice calls, tone analysis can include word choice, cadence, pitch, stress analysis, and waveform analysis. In some embodiments, when the user's identity is known, the fraud analysis server 170 can compare previously analyzed samples of the user's voice with an analysis of the user's voice on the call. Tone analysis for chat can include word choice and pace of typing. If the tone is identified as suspicious, at operation 326, the fraud analysis server 170 can set a positive or non-zero Tone Weight.

At operation 328, the fraud analysis server 170 can determine if the user may be asking about a cash payment. Some payments, such as when repairing a vehicle, may be paid directly to a preferred provider. Users who want the payment made directly to them may, in some cases, can indicate a higher degree of fraudulent claims. Therefore, at operation 330 the fraud analysis server 170 can set a positive or non-zero Cash Payment Weight.

At operation 332, the fraud analysis server 170 can determine if the user is asking how soon a claim can be filed after opening a policy. A statement similar to this can indicate that the loss or damage has already occurred. Additionally, the fraud analysis server 170 can compare the date a claim was filed to any associated chat sessions 154 and voice recordings 156, and determine if the difference exceeds a threshold, such as one month, two months, etc. Accordingly, at operation 334 the fraud analysis server 170 can set a positive or non-zero Timing Weight.

At operation 336, the fraud analysis server 170 can determine if the user is asking about coverage they don't currently have. In many cases, this may be a request for a quote for coverage for a specific event, such as a flood or earthquake, and not actually be fraudulent. In other cases, the request may indicate that damage or loss has already occurred, and thus further investigation may be warranted if a subsequent claim is filed. Therefore, at operation 338 the fraud analysis server 170 can set a positive or non-zero Non-Covered Weight.

At operation 340, the fraud analysis server 170 can determine if the CSR has set a fraud alert during a conversation with the user and at operation 342 can set a positive or non-zero Fraud Alert Weight.

Other factors may be considered after a claim is filed by the user with the enterprise 110. At operation 344, the fraud analysis server 170 can determine if the claim has been filed less than a predetermined threshold of time after the policy was obtained by comparing the claim to the policy issuance date. In some embodiments, if the claim is filed within predetermined thresholds of time (e.g., one month, three months, six months, etc.) of obtaining the policy, at operation 346 the fraud analysis server 170 can set a positive or non-zero Threshold Weight. The positive Threshold Weight may be greater for a lower threshold of time and smaller for a higher threshold of time.

At operation 348, the fraud analysis server 170 can determine if the user is asking about property damage due to one or more events. The fraud analysis server 170 can access news reports, police records and/or crime statistics over the network 130 to see if applicable events may have recently occurred in the area, such as an earthquake and/or riot, or can determine if the address is located in a high crime area. The fraud analysis server 170 can set a positive or non-zero Event Weight at operation 350 if any other events or conditions are determined that may have already caused the damage.

The weighted scores 166 can be saved in the databased 150, such as in the user profile 152 and/or associated with chat sessions 154, voice recordings 156, and/or unmatched fraud records 162. Other factors may be considered and given associated weights. Furthermore, the fraud analysis server 170 may apply different weights for different factors based on geolocation data, multiple factors being identified, etc.

Figure 4:
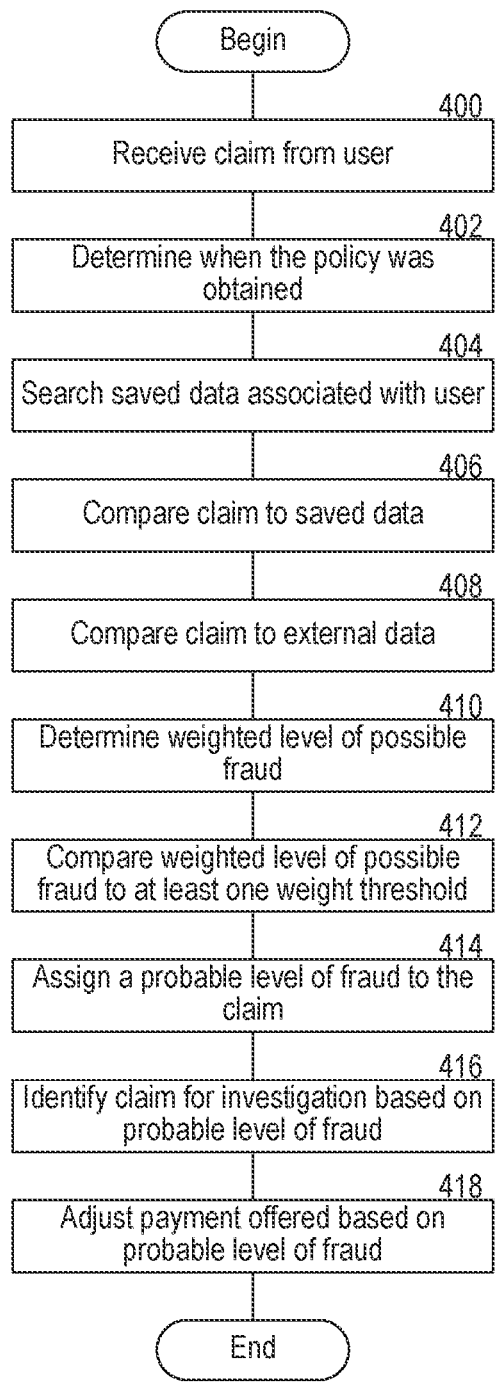
FIG. 4 shows an example process for automatic fraudulent claim detection in accordance with embodiments of the present technology.

III. Automatically Detect Potential Fraudulent Claim as or after the Claim is Filed FIG. 4 shows an example process for automatic fraudulent claim detection in accordance with embodiments of the present technology. At operation 400 the enterprise 110 receives a claim 168 from a user that can be stored in the database 150. The call center server 140 can link to and/or integrate the claim 168 with the user profile 152. The claim 168 can be submitted electronically, such as through the application 122 on the user device 120, through a postal service, or through a call/chat with the enterprise 110 from the user device 120. Operations discussed previously in FIG. 2 can apply equally to the method of FIG. 4. For example, the fraud detection server 170 can detect certain words and/or phrases that can indicate potential fraud and display questions for the CSR to ask the user during the processing/filing of the claim 168.

Although many operations are discussed below as being accomplished by the fraud analysis server 170, in some embodiments the analysis and functionality can be accomplished by the call center server 140 alone or together with the fraud analysis server 170. At operation 402 the fraud analysis server 170 can determine when the policy associated with the claim 168 was obtained. In some cases, the fraud analysis server 170 may set the Threshold Weight (operation 346).

At operation 404, the fraud analysis server 170 can determine if any data associated with the user has been saved, such as in and/or associated with the user profile 152. Data may be chat sessions 154, voice recordings 156 and/or weighted scores 166 that have been set. There may be previously saved unmatched fraud records 162 that may be searched for a match with the claim 168.

At operation 406, the fraud analysis server 170 can compare the claim 166 to the saved data to determine if the claim 168 relates to any previous inquiries. Not all previous inquiries may be indicated as potentially fraudulent. The comparison may take place over a predetermined time period, such as three months or six months. In some embodiments, an increased fraud risk may be determined if the claim 166 is filed within the predetermined time period and the Timing Weight (operation 330) may be set to a positive or non-zero level.

At operation 408, the fraud analysis server 170 can compare the claim 168 to external data, such as weather data as discussed previously. This comparison may result in the fraud analysis server 170 setting one or more weighted scores 166, such as Weather Weight1 (operation 306) and/or Weather Weight2 (operation 310) to a non-zero positive value.

At operation 410, the fraud analysis server 170 can determine a weighted level of possible fraud by combining any weighted scores 166 that have been set. In some cases, no weighted scores 166 are set and thus the weighted level of possible fraud may be zero. In some embodiments, different factors can be weighted more heavily than others. For example, if the Cash Payment Weight (operation 330) and the Set History Weight (operation 318) are both positive values, they may be given a higher weight than the Set Weather Weight1 (operation 306). In other embodiments, if multiple factors have been weighted, each of the factors may be assigned greater weights than if a single factor was weighted.

At operation 412, the fraud analysis server 170 can compare the weighted level of possible fraud to at least one weight threshold 172. In some embodiments, two weight thresholds 172 may be set, while in other embodiments, more than two weight thresholds 172 may be used.

At operation 414, the fraud analysis server 170 can assign a probable level of fraud to the claim 168 based on the result of operation 412. In some embodiments, if the total weighted scores 166 does not exceed a first or lowest weight threshold 172, the probability of fraud can be considered to be low. If the total weighted scores 166 exceeds the first weight threshold 172 but not the second weight threshold 172, the probability of fraud can be considered to be medium. If the total weighted scores 166 exceeds the second weight threshold 172, the probability of fraud can be considered to be high.

At operation 416, the call center server 140 and/or the fraud analysis server 170 can identify if the claim 168 should be investigated based on the probable level of fraud. In some cases, the enterprise 110 may not investigate any claim 168 that do not meet or exceed the first weight threshold 172. In other cases, the enterprise 110 may apply different levels and/or efforts of investigation and/or deny a claim 168 that meets or exceeds the first and/or second weight thresholds 172.

In some embodiments, at operation 418, the enterprise 110 can adjust an offer to pay the claim 168 based on the probability of fraud. In some embodiments, if fraud is difficult to prove for the type of claim 168 and the probability of fraud is determined to be medium, the enterprise 110 can offer a lower payout than if the probability of fraud is low, and an even lower payout if the probability of fraud is high.

This process provides a technical improvement because factors can be automatically tracked, applied, compared and updated for a particular user and/or claim. The enterprise 110 can identify potential fraudulent claims before the claim is paid, and in some cases, before the claim is filed. The enterprise 110 can effectively access different sources of data, provide timely interaction with a CSR who is interfacing with a user either over voice or chat, and apply artificial intelligence to determine if a claim should be paid, and if so, determine the level of payment. Such analysis and cannot be done by humans.

Figure 5:
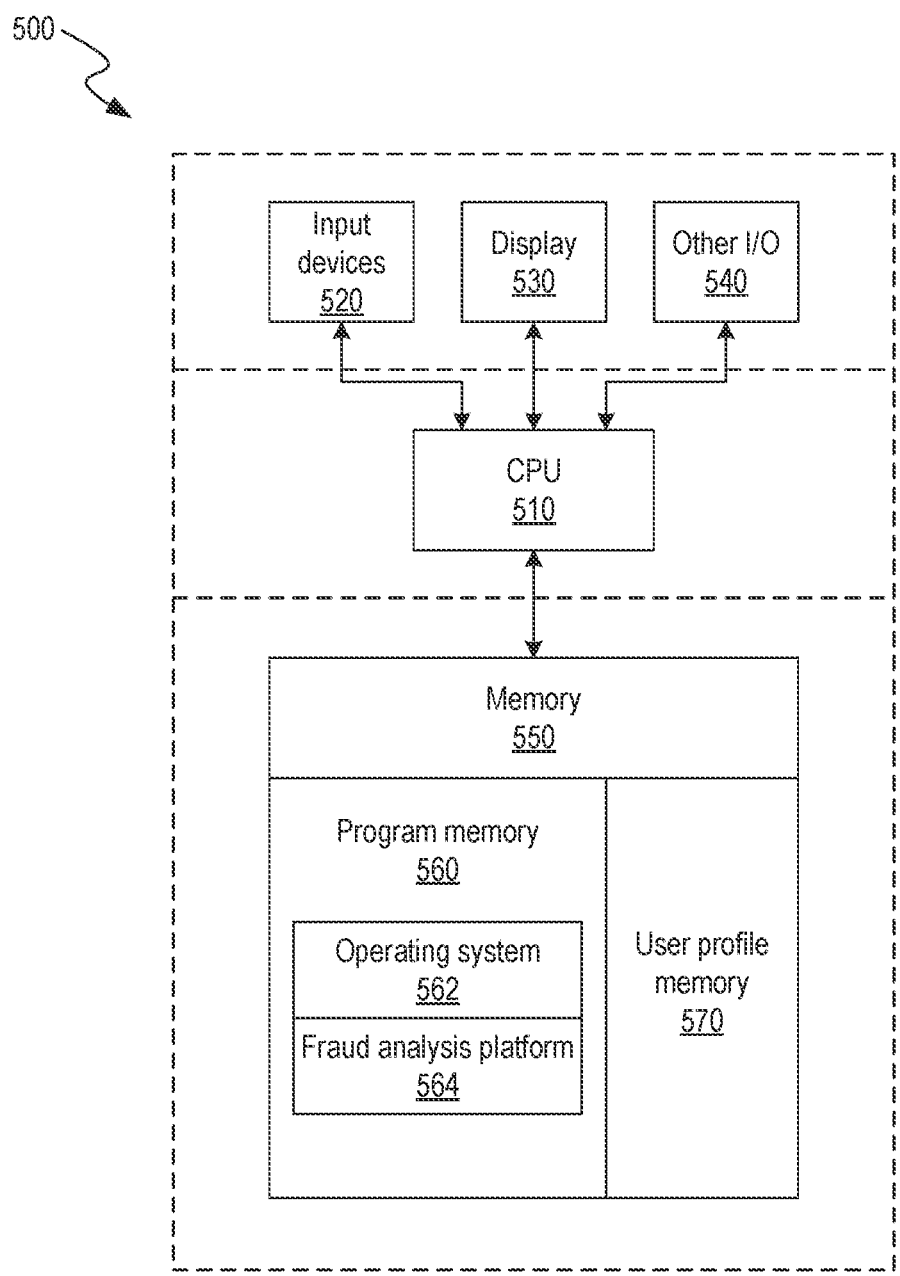
FIG. 5 is a block diagram illustrating an overview of devices on which some implementations of the fraud analysis server can operate in accordance with embodiments of the present technology.

FIG. 5 is a block diagram illustrating an overview of devices on which some implementations of the fraud analysis server 170 can operate in accordance with embodiments of the present technology and will be discussed together with some of the elements of FIG. 1. The devices can comprise hardware components of a device 500, such as the fraud analysis server 170 that includes a fraud analysis platform 564 that requests and receives data from the user and the user device 120. The fraud analysis platform 564 also can send communications such as text messages and emails to the user device 120 and launch the chat window 124 via the application 122 on the user device 120 and/or a web browser. The chat window 124 can be opened on the user device 120 that is operating the voice call. Alternatively, the chat window 124 can be opened on a different user device 120 that has the application 122 if the user is signed into the application 122.

Device 500 can include one or more input devices 520 that provide input to the CPU (processor) 510, notifying it of actions. The actions are typically mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some embodiments, the display 530 can display information and/or questions for the CSR to ask the user during a call/chat. In some examples, display 530 provides graphical and textual visual feedback to a person operating the device 500. In some implementations, display 530 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 540 can also be coupled to the processor, such as a network card, video card, audio card, USB, FireWire or other external device, camera, printer, speakers, CD-ROM drive, DVD drive, disk drive, or Blu-Ray device.

In some implementations, the device 500 also includes a communication device capable of communicating wirelessly or wire-based with a network node (e.g., a server) or with a user device (e.g., a laptop, desktop, or mobile device) or with one or more computers (e.g., desktop or laptop) associated with the CSRs. The communication device can communicate with another device or a server through a network using, for example, TCP/IP protocols. Device 500 can utilize the communication device to distribute operations across multiple network devices.

The CPU 510 can have access to a memory 550. A memory includes one or more of various hardware devices for volatile and non-volatile storage and can include both read-only and writable memory. For example, a memory can comprise a non-transitory machine-readable medium, random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software, such as an operating system 562 and the fraud analysis platform 564. The fraud analysis platform 564 may include modules or processes or methods for requesting and receiving information from a user and user devices 120. The fraud analysis platform 564 can provide a digital solution to identify potentially fraudulent requests, questions and claims, as described in Sections I and II and FIGS. 1 to 4 of this patent document. The fraud analysis platform 564 may also include modules for providing questions for the CSR to ask the user during a call/chat, identify potentially fraudulent scenarios, determine a weighted score and probably of fraud based on one or more factors and suggest a decreased level of payment when fraud is probably but hard to prove. Thus, for example, the memory 550 may store instructions that upon execution by CPU 510 configure the device 500 to perform the operations described for the fraud analysis server 170 in FIGS. 1 to 4 and/or in the various embodiments described in this patent document. Memory 550 can also include user profile memory 570 that can include data associated with users as described in this patent document, which can be provided to the program memory 560 or any element of the device 500.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIG. 1-5 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise." "comprising." and the like are to be construed in an inclusive sense, as opposed to an exclusive or exhaustive sense; that is to say, in the sense of "including, but not limited to." As used herein, the terms "connected." "coupled," or any variant thereof means any connection or coupling, either direct or indirect, between two or more elements; the coupling or connection between the elements can be physical, logical, or a combination thereof. Additionally, the words "herein," "above." "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

I claim:

1. A method comprising:
   receiving, at a device of an enterprise, a communication associated with a claim from a user device associated with a user;
   in response to receiving the communication associated with the claim,
      determining, using a fraud analysis machine-learning platform, a fraud score associated with the claim based on historical weather data associated with a geolocation of the user device,
         wherein the fraud analysis machine-learning platform has been trained using stored potential fraud records or unmatched potential fraud records;
   in response to the fraud score meeting or exceeding at least one threshold, sending information associated with the communication to a fraud server; and
   in response to sending the information to the fraud server, training the fraud analysis machine-learning platform based on a subject of the communication and a number of times a potential fraud record has been recorded in a stored user profile.

2. The method of claim 1, further comprising:
   determining a stored communication associated with the claim, wherein the stored communication was stored by the enterprise before the claim was received; and
   identifying the claim as being a fraud risk when the claim is filed within a predetermined time period of a date associated with the stored communication.

3. The method of claim 1, further comprising:
   identifying the user as a fraud risk based on the fraud score meeting or exceeding the at least one threshold;
   in response to the user being identified as the fraud risk, determining at least one question for a customer service representative of the enterprise to ask the user; and displaying the at least one question on a display associated with the customer service representative of the enterprise.

4. The method of claim 1, further comprising:
increasing the fraud score when the communication includes at least one word or phrase, inputted by the user, indicative of a hypothetical situation.

5. The method of claim 1, further comprising:
identifying the claim as having an increased fraud risk when the communication includes predetermined words or phrases.

6. The method of claim 1, further comprising:
increasing the fraud score when the communication includes at least one word or phrase input by the user that is indicative of time restrictions on filing a potential claim with respect to a policy issuance date.

7. The method of claim 1, wherein the fraud score is further based on at least one of
an anonymous user,
weather associated with the geolocation of the user,
a history of claims filed by the user, predetermined words or phrases input by the user,
a tone of the user,
a request for cash payment,
a question about length of time before a potential claim can be filed after a policy is issued, or
a question about property loss or damage.

8. A system comprising:
one or more processors; and
one or more memories storing instructions that, when executed by the one or more processors, cause the system to perform a process comprising:
receiving, at a device of an enterprise, a communication associated with a claim from a user device associated with a user;
in response to receiving the communication associated with the claim,
determining, using a fraud analysis machine-learning platform, a fraud score associated with the claim based on historical weather data associated with a geolocation of the user device,
wherein the fraud analysis machine-learning platform has been trained using stored potential fraud records or unmatched potential fraud records;
in response to the fraud score meeting or exceeding at least one threshold, sending information associated with the communication to a fraud server; and
in response to sending the information to the fraud server, training the fraud analysis machine-learning platform based on a subject of the communication and a number of times a potential fraud record has been recorded in a stored user profile.

9. The system of claim 8, wherein the process further comprises:
determining a stored communication associated with the claim, wherein the stored communication was stored by the enterprise before the claim was received; and
identifying the claim as being a fraud risk when the claim is filed within a predetermined time period of a date associated with the stored communication.

10. The system according to claim 8, wherein the process further comprises:
identifying the user as a fraud risk based on the fraud score meeting or exceeding the at least one threshold;
in response to the user being identified as the fraud risk, determining at least one question for a customer service representative of the enterprise to ask the user; and
displaying the at least one question on a display associated with the customer service representative of the enterprise.

11. The system of claim 8, wherein the process further comprises:
increasing the fraud score when the communication includes at least one word or phrase, inputted by the user, indicative of a hypothetical situation.

12. The system of claim 8, wherein the process further comprises:
identifying the claim as having an increased fraud risk when the communication includes predetermined words or phrases.

13. The system of claim 8, wherein the process further comprises:
increasing the fraud score when the communication includes at least one word or phrase input by the user that is indicative of time restrictions on filing a potential claim with respect to a policy issuance date.

14. The system of claim 8, wherein the fraud score is further based on at least one of
an anonymous user,
weather associated with the geolocation of the user,
a history of claims filed by the user, predetermined words or phrases input by the user,
a tone of the user,
a request for cash payment,
a question about length of time before a potential claim can be filed after a policy is issued, or
a question about property loss or damage.

15. A non-transitory computer-readable medium storing instructions that, when executed by a computing system, cause the computing system to perform operations comprising:
receiving, at a device of an enterprise, a communication associated with a claim from a user device associated with a user;
in response to receiving the communication associated with the claim,
determining, using a fraud analysis machine-learning platform, a fraud score associated with the claim based on historical weather data associated with a geolocation of the user device,
wherein the fraud analysis machine-learning platform has been trained using stored potential fraud records or unmatched potential fraud records;
in response to the fraud score meeting or exceeding at least one threshold, sending information associated with the communication to a fraud server; and
in response to sending the information to the fraud server, training the fraud analysis machine-learning platform based on a subject of the communication and a number of times a potential fraud record has been recorded in a stored user profile.

16. The non-transitory computer-readable medium of claim 15, wherein the operations further comprise:
determining a stored communication associated with the claim, wherein the stored communication was stored by the enterprise before the claim was received; and
identifying the claim as being a fraud risk when the claim is filed within a predetermined time period of a date associated with the stored communication.

17. The non-transitory computer-readable medium of claim 15, wherein the operations further comprise:

identifying the user as a fraud risk based on the fraud score meeting or exceeding the at least one threshold;

in response to the user being identified as the fraud risk, determining at least one question for a customer service representative of the enterprise to ask the user; and displaying the at least one question on a display associated with the customer service representative of the enterprise.

18. The non-transitory computer-readable medium of claim 15, wherein the operations further comprise:

increasing the fraud score when the communication includes at least one word or phrase, inputted by the user, indicative of a hypothetical situation.

19. The non-transitory computer-readable medium of claim 15, wherein the operations further comprise:

identifying the claim as having an increased fraud risk when the communication includes predetermined words or phrases.

20. The non-transitory computer-readable medium of claim 15, wherein the operations further comprise:

increasing the fraud score when the communication includes at least one word or phrase input by the user that is indicative of time restrictions on filing a potential claim with respect to a policy issuance date.

\* \* \* \* \*